United States Patent [19]

Gerber

[11] Patent Number: 4,503,988
[45] Date of Patent: Mar. 12, 1985

[54] GAS COLLECTING TENSIONED RESERVOIR COVER

[75] Inventor: Dennis H. Gerber, Los Gatos, Calif.

[73] Assignee: Burke Industries, Inc., San Jose, Calif.

[21] Appl. No.: 651,665

[22] Filed: Sep. 17, 1984

[51] Int. Cl.³ .............................................. B65D 88/38
[52] U.S. Cl. .................................... 220/219; 220/216
[58] Field of Search ................................ 220/216, 219

[56] References Cited

U.S. PATENT DOCUMENTS

| | | | |
|---|---|---|---|
| Re. 30,146 | 11/1979 | Dial et al. | 4/499 X |
| 1,136,230 | 4/1915 | Holmes . | |
| 1,513,043 | 10/1924 | Huff . | |
| 1,777,560 | 10/1930 | Griffin . | |
| 2,007,193 | 7/1935 | Griffin | 220/26 |
| 2,601,317 | 6/1952 | Moyer | 220/26 |
| 2,867,347 | 1/1959 | Champagnat | 220/26 |
| 3,313,443 | 4/1967 | Dial et al. | 220/219 |
| 3,474,931 | 10/1969 | Daniels et al. | 220/26 |
| 3,517,513 | 6/1970 | Renshaw et al. | 220/218 |
| 3,815,367 | 6/1974 | Collins et al. | 220/216 X |
| 3,874,175 | 4/1975 | Winters | 220/216 X |
| 3,980,199 | 9/1976 | Kays . | |
| 3,991,900 | 11/1976 | Burke et al. | 220/219 |
| 4,139,117 | 2/1979 | Dial | 220/218 |
| 4,438,863 | 3/1984 | Wilson et al. | 220/219 X |
| 4,476,992 | 10/1984 | Gerber | 220/216 X |

Primary Examiner—Steven M. Pollard
Attorney, Agent, or Firm—James R. Cypher

[57] ABSTRACT

A flexible cover for placement upon the fluid surface of an open reservoir. A plurality of elongated weights form elongated sumps in the cover for the collection of surface water. All horizontal portions of the cover and the sump walls are in biaxial tension. A perimeter gas manifold at the periphery of the reservoir receives gas generated beneath the cover. The flow of gas to the periphery is enhanced by varying the linear weight of the sump weights or by placing small weights on the horizontal cover portions. Floats may also be placed beneath the cover to collect the gas. Different weight cover portions are also used to enhance gas migration to gas manifolds. The cover may also be formed with floats adjacent the sumps to facilitate the removal of gas driven against the float by ambient winds.

19 Claims, 16 Drawing Figures

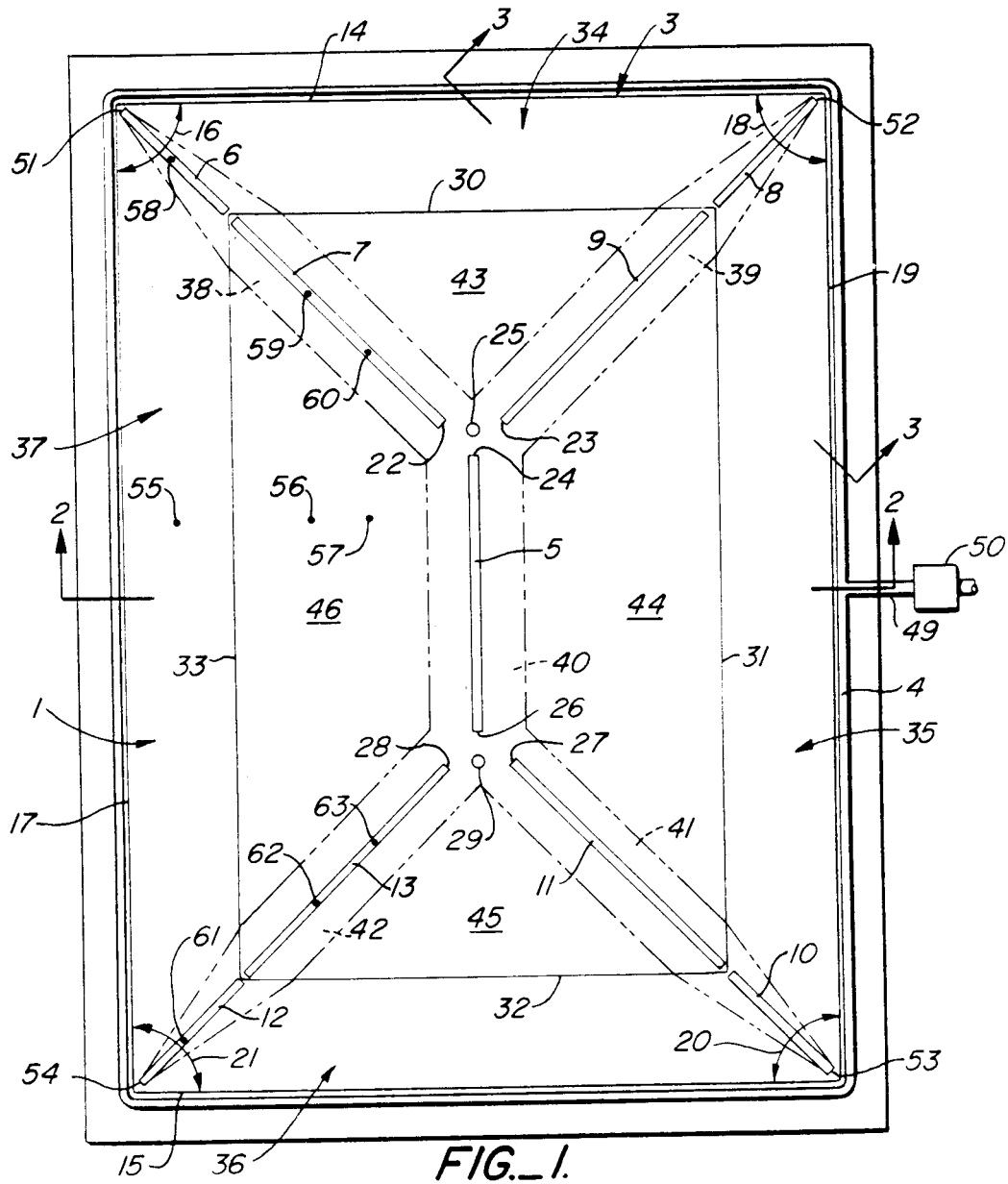
FIG._1.
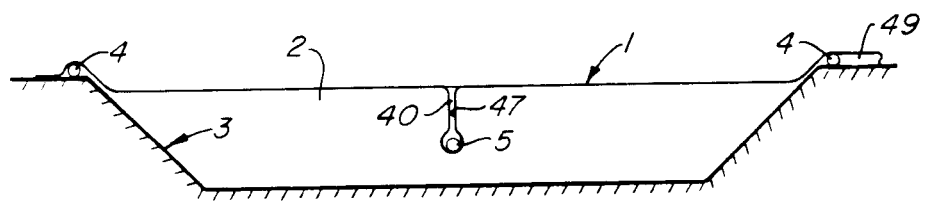
FIG._2.
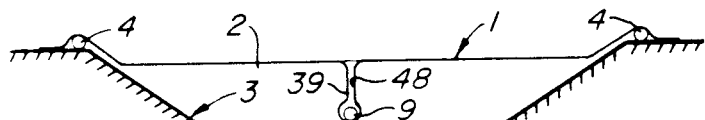
FIG._3.

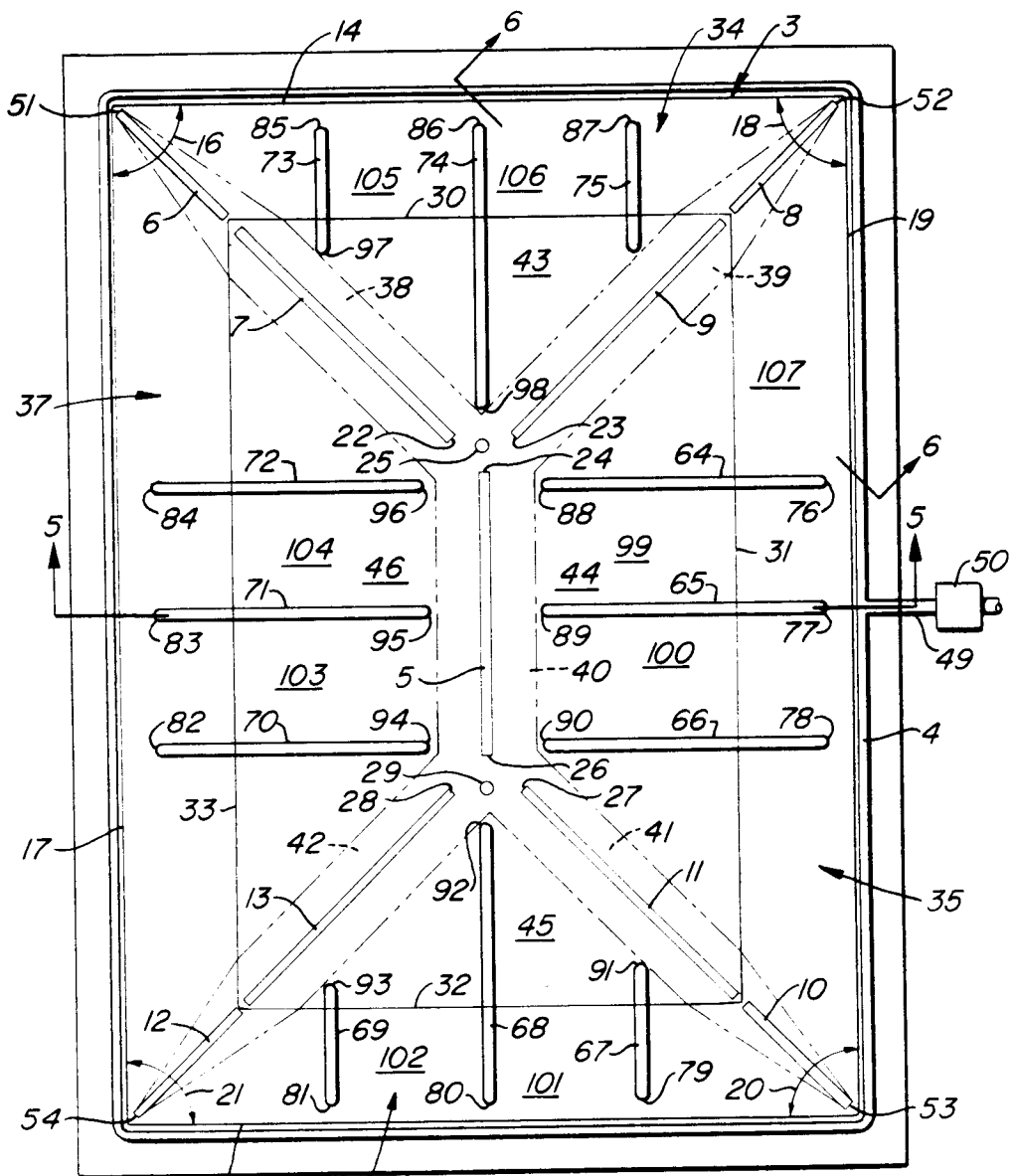
FIG._4.
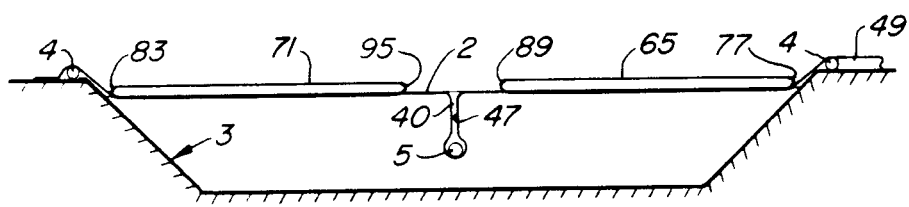
FIG._5.
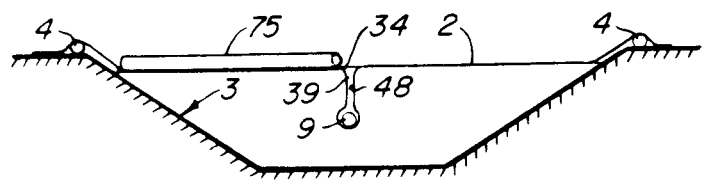
FIG._6.

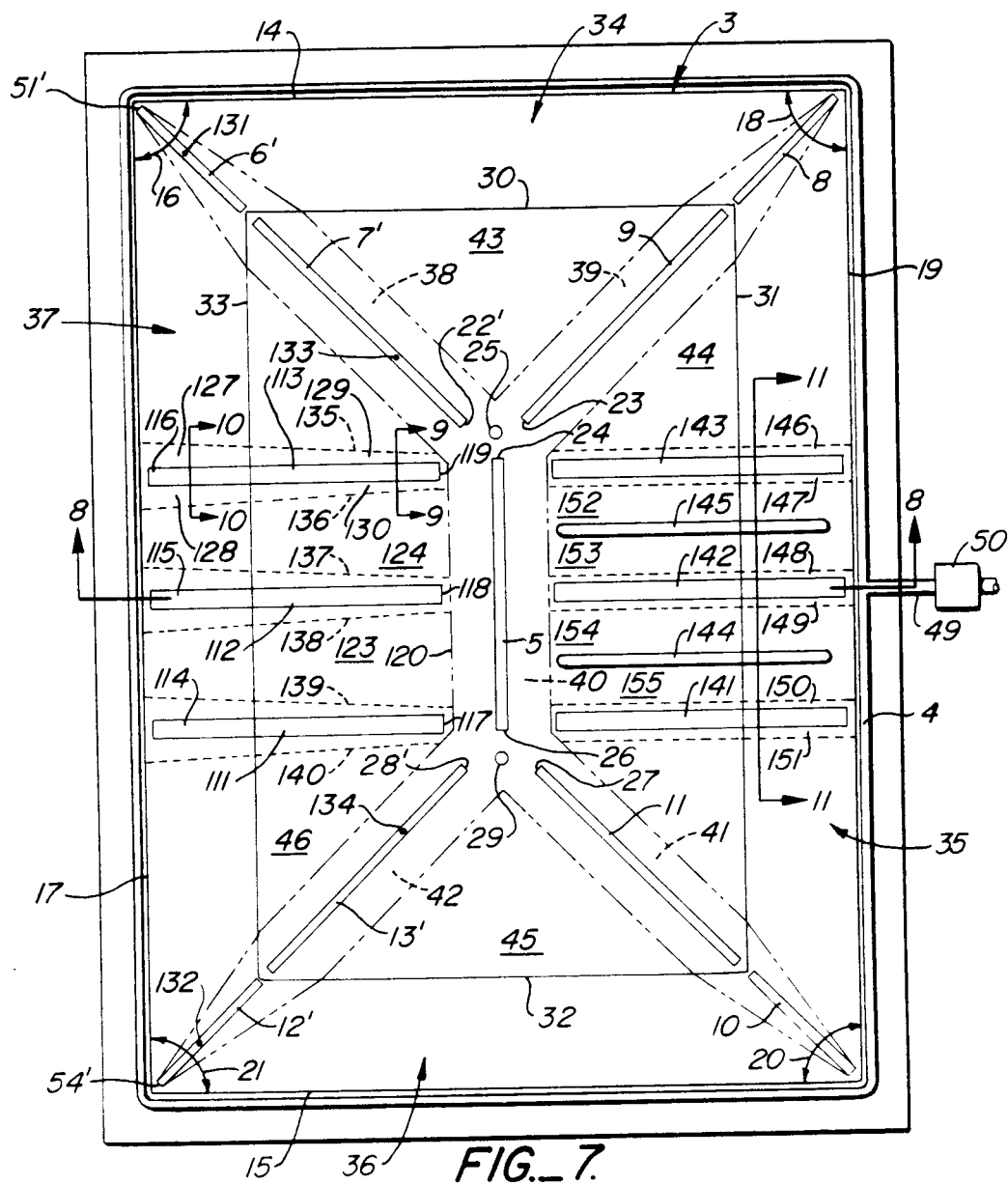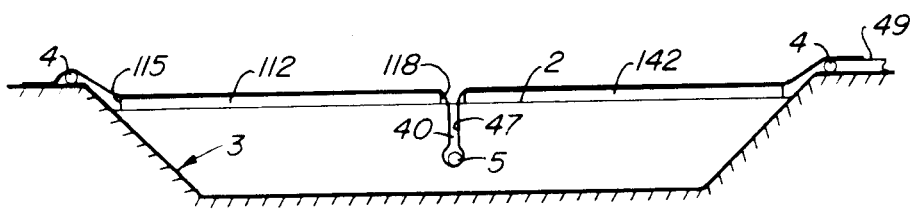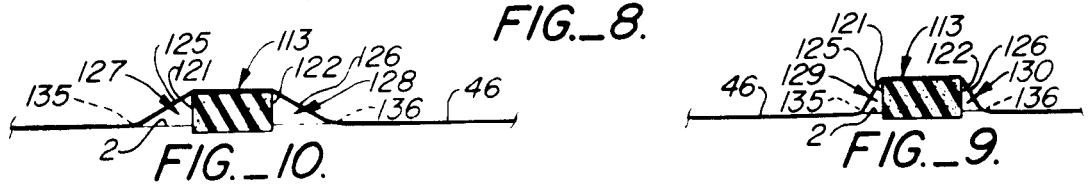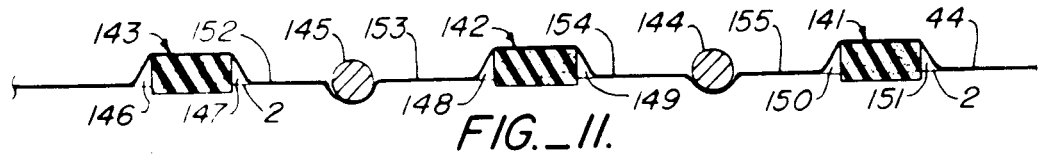

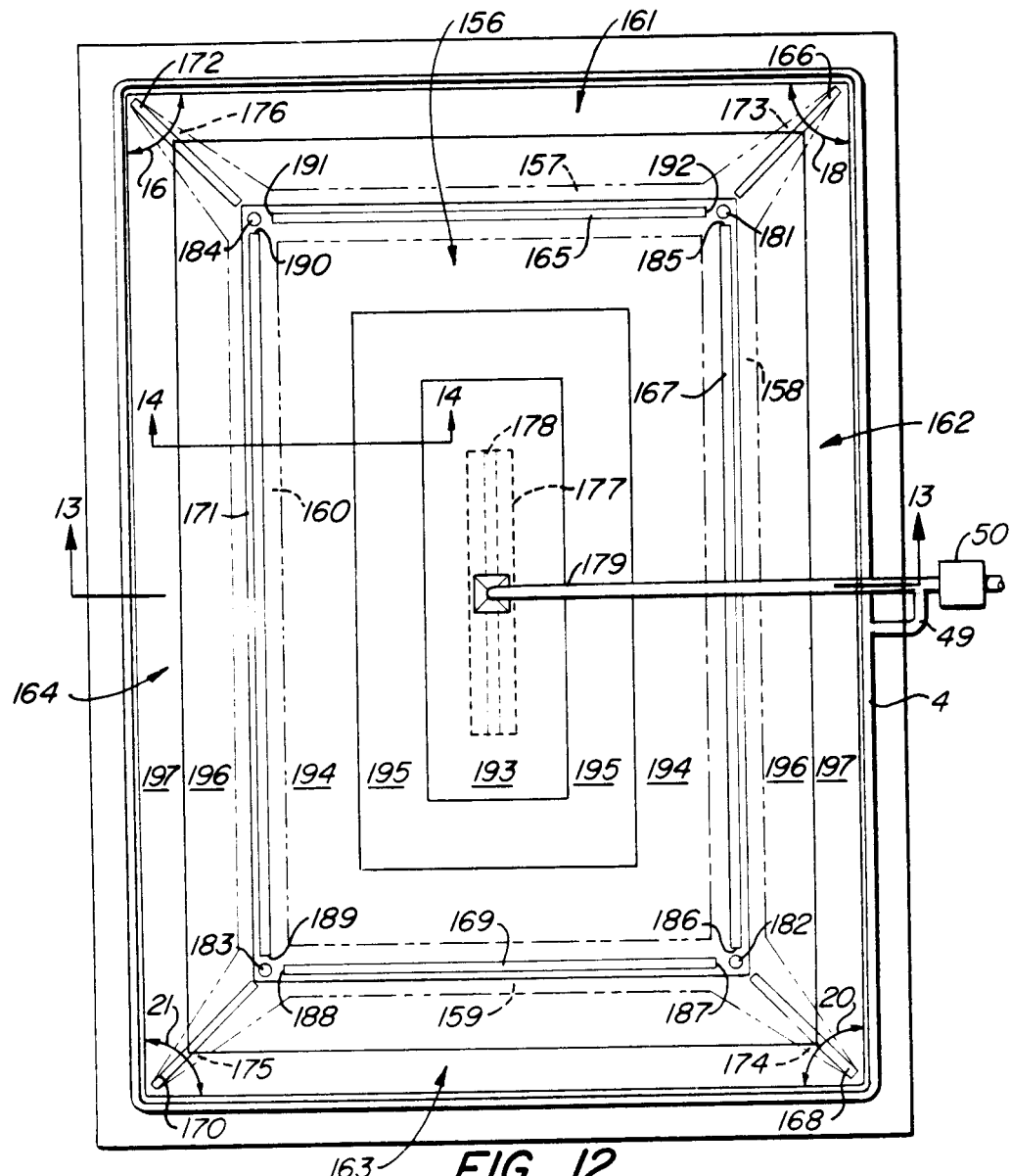
FIG._12.
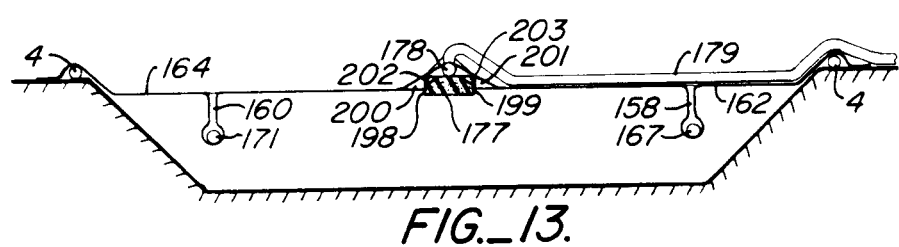
FIG._13.
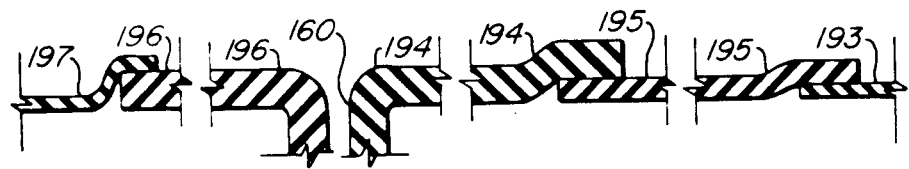
FIG._14.

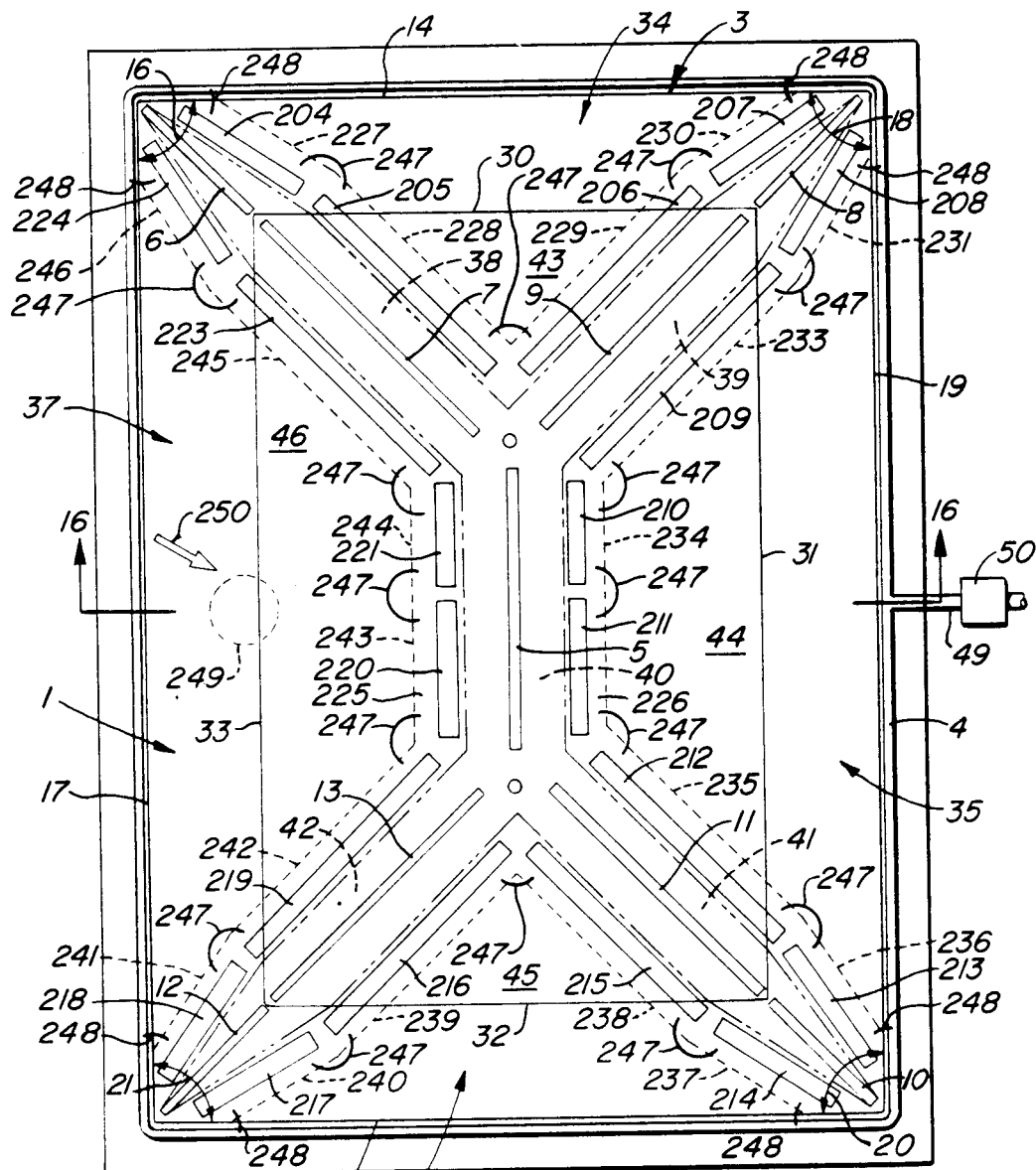
FIG._15.
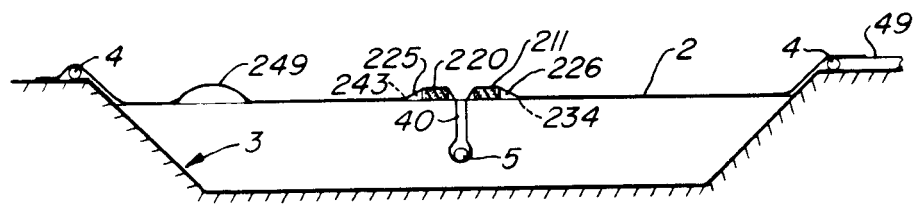
FIG._16.

GAS COLLECTING TENSIONED RESERVOIR COVER

BACKGROUND OF THE INVENTION

This invention relates to a flexible cover for a reservoir for the purpose of containing and collecting gases generated by or charged in or through the liquid and/or solid material contained in the reservoir and for draining surface water to collection sumps.

This application is co-pending with my application entitled Reservoir Cover with Tensioned Plates, Ser. No. 06/425,556, base issue paid Aug. 2, 1984 which was a continuation-in-part of my application entitled Tensioned Plate Reservoir Cover, Ser. No. 06/332,972 filed Dec. 21, 1981.

Early efforts in containing and venting but not collecting gases occurred in the petroleum industry where gases had to be vented from the stored hydrocarbons to prevent explosions. Examples of such teachings are found in Holmes, U.S. Pat. No. 1,136,230 (1915), Huff, U.S. Pat. No. 1,513,043, (1924), Griffin, U.S. Pat. No. 1,777,560, (1930) and U.S. Pat. No. 2,007,193, (1935), Moyer, U.S. Pat. No. 2,601,317, (1952) and Champagnat, U.S. Pat. No. 2,867,347 (1959). All of these patents are specific to cylindrical steel tanks and the covers are constructed with a plurality of floating pontoon or boat-like segments and skirt members to seal the sides of the pontoons and the smooth cylindrical vertical sides of the tank. Since the floats or covers of the prior art are rigid, the gas beneath the heavy rigid cover is simply under pressure and is vented at random points on the cover by vent pipes or drawn off by a vacuum pump. Rainwater in such oil storage tanks is either shed by steel roofs or collected in low points in the floating pontoons.

Daniels, U.S. Pat. No. 3,474,931, (1969) teaches a flexible blanket but the blanket is held above the surface of the liquid by floats.

Kays, U.S. Pat. No. 3,980,199 presents an attempted solution to collect gas from a reservoir by placing a flexible cover directly on the surface of the liquid. The Kays cover is not in tension but rather lays loosely on the liquid surface and in practice would develop random folds which would prevent the flow of gas beneath the cover to the gas collecting means and would at the same time prevent the free flow of rainwater to surface water collection points on the upper surface of the cover. It is believed the Kays patent illustrated in FIGS. 1-3 will not operate as disclosed and the second form illustrated in FIGS. 4-7 is also inoperative.

BRIEF SUMMARY OF THE INVENTION

The gist of the present invention is the use of a cover as taught in my co-pending application entitled RESERVOIR COVER WITH TENSIONED PLATES filed Sept. 28, 1982, Ser. No. 06/425,556 (Issue Fee paid Aug. 2, 1984) in combination with a perimeter gas collection system, or a central manifold gas collection system.

The pending application illustrates a plurality of reservoirs having different geometric shapes. The pending application also shows covers for slope sided reservoirs as well as vertical sided reservoirs. All of the covers shown in the pending application show covers in which all horizontal portions are in tension. All of the covers either have panels, all of which are attached to the perimeter or have panels which attach to the perimeter and include one or more central panels. For purposes of this application only the slope sided rectangular reservoir is shown but it is to be understood that all of the reservoirs shown in the pending application may be used with either of the two manifold systems illustrated in this application. The present application will collect surface water which falls upon the cover in the form of rain in deep sumps formed in the cover by weights placed upon the cover in the same manner as the co-pending application and will also collect gas generated or introduced beneath the cover in such a way that it can be easily carried off in a manifold system. The flow of the gas to the perimeter of the reservoir or to a collection point on a central panel may be enhanced by placing elongated weights on the surface of the cover. These surface weights are lighter than the weights used to form the water sumps and remain on the surface rather than forming additional sumps.

Another system for enhancing the migration of gas to the perimeter or to the collectidn point in the central panels is to place a plurality of elongated floats under the tensioned panel cover portions creating a gas opening parallel to and on both sides of the float. The weights in the sumps maintain the cover in tension which holds the cover away from the sides of the sump and keeps the gas opening fully open.

Still another system for enchancing the flow of gas to the perimeter or to the collection point in the central panels is to place elongated floats under the cover as previously described and then to place small weights on both sides of the floats spaced parallel thereto.

A further system for enchancing the flow of gas to the perimeter or to the collection point in the central panels is to construct the cover with material having a different weight per square area. Thus by placing the lightest weight material closest to the periphery or the collection point on the central panel, the gas will have less difficulty in migrating to the collection point due to the decrease in pressure caused by the weight of the cover as the gas approaches the manifold collection point.

It has been found that the different means enchancing gas migration also enchances the flow of surface water in the opposite direction.

BRIEF DESCRIPTION OF THE DRAWINGS

FIG. 1 is a top plan view of a reservoir covered by a gas collection cover constructed in accordance with the present invention.

FIG. 2 is a cross sectional view of the reservoir shown in FIG. 1 taken generally along the line 2—2.

FIG. 3 is a cross sectional view of a portion of the reservoir of FIG. 1 taken along line 3—3.

FIG. 4 is a plan view of a reservoir with a gas collection cover similar to the cover shown in FIG. 1 but with additional weights to enhance the migration of gas to the collection manifold.

FIG. 5 is a cross section of the reservoir of FIG. 4 taken along line 5—5 of FIG. 4.

FIG. 6 is a cross sectional view of a portion of the reservoir shown in FIG. 4 taken alone line 6—6.

FIG. 7 is a top plan view of a reservoir covered by a gas collection cover similar to the cover in FIG. 1 but with two additional forms of systems for enhancing the migration of gas to the gas collection manifold. The system on the left side to the cover includes a systems of floats and the system on the right side of the cover includes a system of floats and small weights.

FIG. 8 is a cross sectional view of the reservoir and cover shown in FIG. 7 taken along line 8—8.

FIG. 9 is a cross section of a float taken along line 9—9 of FIG. 7.

FIG. 10 is a cross sectional view of a float taken along line 10—10 of FIG. 7.

FIG. 11 is a cross sectional view of the form of the gas migration enhancement system taken along line 11—11 of FIG. 7 showing the use of alternating floats and small weights.

FIG. 12 is a top plan view of a reservoir showing still another gas collection cover.

FIG. 13 is a cross sectional view of the reservoir and cover in FIG. 12 taken along line 13—13.

FIG. 14 is a cross sectional view of a portion of the cover taken along line 14—14 of FIG. 12.

FIG. 15 is a top plan view of another form of the invention. The floats and weights are illustrated in the positions they are located when the reservoir is empty. The broken lines indicate the perimeter of the sumps and horizontal cover portions.

FIG. 16 is a cross sectional view of the reservoir of FIG. 15 taken along line 16—16. The position of the cover, weights and floats illustrate the position of these members when the reservoir is at the full level.

DESCRIPTION OF THE PREFERRED EMBODIMENTS

With the modifications set forth in this application, all of the covers for all of the types of reservoirs described in my co-pending application, Ser. No. 06/425,556 may be used to collect gases which are either introduced into the reservoir or generated in the reservoir. All water contains entrained air and some reservoirs which have an unusually high air content will benefit from the adoption of the present cover. In most instances, however, the gas is generated by anerobic means from waste animal or plant material. Methane gas is a common gas generated by the decomposition of such wastes.

It is also useful in certain processes to charge air or gas into a body of liquid and or solids. This cover may be used where it is necessary to collect these charged in gases and the gaseous products of the process.

The present cover with slight modifications may be used in many configurations of open reservoirs. Three well known general categories of reservoirs are those with vertical sidewalls, sloped sidewalls and reservoirs having both vertical and sloped sidewalls. These reservoirs may have varying geometric shapes in plan, but for purposes of brevity, only the sloped sided rectangular reservoir will be described. It is to be understood that the reservoirs referred to may have an area of a few hundred square feet to several hundred acres.

Referring to FIGS. 1–3, the tensioned reservoir cover for placement upon the fluid surface 2 of an open reservoir 3 consists of a flexible cover member 1 of substantially fluid impervious material of sufficient area to cover the sidewalls and bottom of the reservoir when empty.

Means are provided for connecting the perimeter of the cover member to the perimeter of the reservoir. Standard connections may be used and are commercially available. A gas collecting means is located at the periphery of the reservoir and may consist simply of a manifold pipe 4 formed with openings to permit gas to enter along its length. The manifold pipe preferably extends around the entire perimeter of the reservoir so that as soon as the gas exits the perimeter of the cover, it is carried away in the perimeter manifold pipe.

The weighting means may consist of any semi-flexible or segmented weights in line such as a plurality of sand filled tubes 5–13 positioned with respect to the cover member at pre-selected locations. The tubes are preferably made from the same material used to make the cover. Any type of material may be used for the weights but sand is preferred since it is inexpensive, flexible and does not tear the cover material. The weights may be positioned with respect to the cover member either by gravity and friction but preferably some mechanical connection such as bonding is made between the weights and the cover to insure that they do not roll or move about. The weights for a slope sided reservoir of rectangular configuration are positioned as shown in FIG. 1. Weight 5 is placed at the approximate center line of the reservoir and extends towards reservoir sides 14 and 15 and extends to points approximately at the intersection of lines bisecting the corners of the reservoir. Weights 6 and 7 lie along the line bisecting the angle 16 formed by the intersection of sides 17 and 14. Weights 8 and 9 lie along the line bisecting the angle 18 formed by the intersection of reservoir sides 14 and 19. Weights 10 and 11 lie along the line bisecting the angle 20 formed by the intersection of sides 19 and 15. Weights 12 and 13 lie along the intersection of angle 21 formed by the intersection of reservoir sides 15 and 17. Note that end 22 of weight 7, end 23 of weight 9; and end 24 of weight 5 terminate a distance from one another so that as the reservoir fills, and the ends of the weights move toward one another, they will not touch so as to create stresses in the cover. A spot weight 25 is preferably connected to the cover at the approximate center of the intersection of lines extending from each of the three lines of weights. Also, end 26 of weight 5, end 27 of weight 11 and end 28 of weight 13 terminate a distance from one another. Spot weight 29 is preferably connected to the cover at the approximate center of the intersection of lines extending from each of the three lines of weights.

Referring to FIG. 1, lines 30–33 represent the toe of slope sides 34–37 respectively.

The weights are shown as they would appear when the reservoir is empty. The phantom lines designated the border lines between the sumps 38–42 and the generally horizontal cover portions 43–46 when the reservoir is full.

Each of the cover sump portions formed in the cover by the weighting means for all operational fill levels of the reservoir is defined, narrow, elongated and interconnected with all of the other sumps. As shown in FIGS. 2 and 3, the sumps have generally vertical walls as illustrated by the numbers 47 and 48. The sumps are pre-programmed located over the entire range of working fluid level conditions. The sumps and the horizontal cover portions form in substantially the same location for each fill level.

The weighting means create in the cover member a plurality of biaxially tensioned horizontal cover portions 43–46 which sometimes are referred to as plates. The tension is biaxial in that the placement of the weights creates a horizontal force in two different horizontal directions over the entire range of working fluid levels and over substantially the entire area of the reservoir such that workmen can walk upon every horizontal portion of the cover without any flotation support or even special foot pads. The biaxial tension in the cover member for a vertical sided reservoir results from placing the weights on the cover so that at least two defined sumps cross or are coincident with substantially all section lines extending across non-adjacent sides of the reservoir.

The biaxial tension in the cover member for a slope sided reservoir results from placing the weights on the cover so that at least a single defined sump crosses or is coincident with substantially all section lines extending across non-adjacent sides of the reservoir.

The sumps are interconnected so that surface water draining into any sump may flow into all of the sumps so that one or more strategically located sump pumps or drains can drain all of the sumps. Since the sumps maintain generally the same location, the drains or sumps need not be moved about to dewater the surface water from the reservoir.

The horizontal cover portions 43-46 have a selected geometric shape and are positioned at a selected location for all working fill levels of the reservoir. Workmen entering onto the reservoir cover can be assured that the location of the sumps will not change and that the horizontal cover portions will remain substantially planar in sustaining the weight of the workmen.

It has been discovered that as gas builds up beneath the cover, it tends to migrate along the underside of the cover to the perimeter of the reservoir. As shown in FIGS. 1-3, a manifold pipe 4 with openings along its length is placed entirely around the reservoir. A take-off pipe 49 is connected to the manifold pipe and a vacuum pump 50 may be inserted into the system to facilitate the recovery of the gas.

It should be noted that as the reservoir fills, the sump weights lift off the bottom of the reservoir. Thus at all working fill levels, the weight of the sump weights cause the vertical sidewalls of the sumps and the horizontal portions to be in biaxial tension such that workmen can freely traverse all horizontal portions of the cover. Since the sumps pose a potential hazard to workmen, it is customary to attach floats to either the top or underside of the cover adjacent and on both sides of the sumps. The floats serve to further define and visually locate the sumps and serve as an emergency hand hold should a workman accidentally fall into a sump.

Still referring to FIGS. 1-3, it has been found that the migration of the gas beneath the cover can be enhanced to flow more rapidly to the periphery and to the manifold pipe 4 without the addition of any more inlet pipes, manifolds or by the addition of heavier duty suction pumps. Gas enhancement may be effected by simply constructing the sump weight members which extend from proximal locations bordering the perimeter of the reservoir so that they have an increasing linear weight in direct proportion to the distance from the proximal location at the perimeter of the reservoir. In other words, weights 6 and 7 increase in weight from the proximal point 51 to the distal point 22; weights 8 and 9 increase in weight from the proximal point 52 to the distal point 23; weights 10 and 11 increase in weight from the proximal point 53 to the distal point 27; and weights 12 and 13 increase in weight from the proximal point 54 to the distal point 28. Weight 5 has the same linear weight distribution throughout its length.

To illustrate the effect of the varying linear weights of sump weights 6-13 on the migration of gas toward the periphery of the reservoir, consider the three arbitrary points 55-57 on horizontal cover portion member 46, and arbitrary points 58 on sump weight 6 and arbitrary point 61 on weight 12. Points 58 and 61 form a straight line which is parallel to the side 17 of the reservoir. The weight at points 58 and 61 exert forces acting in opposite directions and exert a tension force at point 55. The weights at point 59 and 62 which are in a straight line and parallel to side 17 are greater in weight than the previous weights and therefore exert a greater tension force on point 56 than is exerted at point 55. Likewise, the weights at points 60 and 63 are even greater than the previous two weights and therefore exert an even greater force on point 57 which lies in a straight line with points 60 and 63 and parallel to side 17. Looking at the graduation of pressure from the view point of a bubble of gas which rises to the surface, the pressure of the cover on the surface is less in the direction of the perimeter of the cover so the migration of the bubble of gas is enhanced in the direction of the perimeter. Since the weights are preferably gradually increased in weight, the pressure on the gas is likewise an evenly increasing graduation and therefore the gas moves slowly under the decreasing pressure toward the perimeter and the gas collection manifold.

Since all of the sump weights except weight 5 are linearly heavier as the distance from the perimeter increases, all of the horizonal cover portions 43, 44 and 45 exert a graduated pressure in the identical manner as just discussed. Thus, gas moves from the center of the reservoir to the nearest perimeter point in a generally straight line. Removal of the gas as quickly as possible reduces the hazards connected with an accumulation of gas and there is less tendency for the cover to develop large bubbles of gas which lift the cover and render it subject to damaging wind forces.

Referring to FIGS. 4, 5 and 6, another means for enhancing the migration of gas is illustrated. The cover illustrated is similar to the cover shown in FIG. 1 and the description is not repeated. In this form of the invention, a plurality of surface weight means are shown which have a linear weight substantially less than the linear weight of the sump weighting means previously described. The surface weight means include a plurality of elongated surface weight members 64-75 which extend from proximal locations bordering the perimeter of the reservoir and carry the number designations 76-87 and terminate at distal locations 88-98. The surface weights depress portions of the horizontal cover portions along selected lines extending from the proximal locations to the distal locations. The surface weights follow generally straight lines which intersect the perimeter of the reservoir at generally right angles. The surface weights delineate a path means indicated by the numbers 99-106 for enhancing the migration of gas from beneath the horizontal portions of the cover to the gas collection means bordering the perimeter of the reservoir. For example, gas beneath path 99 will tend to stay between weights 64 and 65 rather than stray beneath triangular cover portion 107 or beneath path 100. Instead, the gas will tend to travel directly to the edge of the cover and into the collection gas manifold.

To enhance the migration of gas even more effectively, each of the surface weights 64-75 may be constructed having a progressively increasing linear weight in direct proportion of the distance from the proximal location at the perimeter of the reservoir to the distal location. Since the surface weights are preferably made from tubes made from the same material as the cover and filled with sand, it is a simple matter to make the tubes in the shape of an elongate narrow truncated cone instead of a simple cylinder. For example, if weights 64 and 65 are constructed so that they are heavier at distal locations 88 and 89 than they are at proximal locations 76 and 77, greater pressure will be exerted on the surface gas by the cover adjacent locations 88 and 89 than in the path 44 at locations adjacent the proximal locations 76 and 77 and thus the gas will tend to migrate faster and more directly to the perimeter of the cover and into the manifold pipe 4.

It is to be understood that the surface weights constructed with the linear increasing weight feature can be used with the sump weights which also have the linear increasing weight feature previously described.

Another system of enhancing the migration of gas from beneath the cover to the peripheral manifold system is to use top side floats instead of surface weights. The floats may be aqy closed cell light weight plastic foam material of any geometric cross section but preferably rectangular. The floats may be covered with the same material as that used in constructing the cover. The floats would have the same length as the weight members shown in FIGS. 4–6 and be placed on top of the cover in the exact locations as the surface weights. The floats would indeed have some weight and would depress the cover slightly as is the case with the tubular sand filled weights. The floats, however, would facilitate safer access to the cover and would provide further safety provision for if the cover should develop a tear, the floats would stop the progression of the tear and would serve to buoy any workmen trapped on the cover. The path means for the migration of the gas would be identical to paths 99–106 shown in FIG. 4.

In order to provide even greater stability to the cover, weights may be connected to the floats. This system would be used in areas subject to high winds and/or covering reservoirs where unusually great amounts of gas are charged in or produced.

Referring to FIGS. 7–10, another form of gas migration enhancing system is illustrated. The reservoir is a rectangular sloped wall structure as previously described in referring to FIGS. 1 and 4. The cover actually illustrates two different gas migration enhancing systems which would not normally be used on the same cover but are here shown on one cover for purposes of brevity of drawings. The enhancement system shown on the left side of the drawing will be considered first. Before proceeding, however, the sump weights are identical to the sump weights previously described in FIGS. 1 and 4 except that the sump weights are constructed with the progressively increasing linear weight feature which has also been described. For this reason, the like parts of the reservoir and sump weights retain the same numbers and the description is not repeated.

A plurality of elongated cover lifting float members are located under each horizontal cover portion of the entire cover. For example, cover lifting float members 111–113 are attached to horizontal cover portion 46. Proximal ends 114–116 of the cover lifting floats extend to locations adjacent the periphery of the reservoir and distal ends 117–119 extend to inner edge 120 of the horizontal cover portion or plate 46. The cover lifting float members may be constructed from a closed cell plastic and covered with the same material that is used to construct the reservoir cover. Each of the cover lifting float members is placed beneath the cover and the top surface of the float is connected to the cover as with a suitable adhesive. As shown in FIGS. 9 and 10, this leaves the sides 121 and 122 of the floats unconnected to the cover. The floats are spaced from one another in parallel leaving straight paths 123 and 124 therebetween. The floats follow generally straight lines and intersect the perimeter of the reservoir at generally right angles.

The cover lifting float members raise the cover above the fluid surface 2 as shown in FIGS. 9 and 10 leaving the sides 121 and 122 above the surface. Since the cover is in tension due to the sump weights such as sump weights 12', 13' and sump weights 6' and 7' pulling in opposite directions, the portions 125 and 126 immediately adjacent the float are pulled away from sides 121 and 122 of the float and form a constantly open passageway for passage of gas from the underside of the horizontal cover portion to the gas collection means bordering the reservoir.

Preferably, the cover lifting float members are large enough and have sufficient buoying to support a workman as well as lift the cover above the surface against the downwardly acting force of the sump weights. A still further enhanced gas migration system can be effected by constructing the sump weighting means which extend from the proximal locations bordering the perimeter of the reservoir so that they will have a progressively decreasing linear weight in proportion to the distance from the proximal location at the perimeter of the reservoir. This linear decreasing weight of the sump weight members causes the passages 127 formed between side 121 of the float and cover portion 125 and passage 128 formed by float side 122 and cover portion 126 as illustrated in FIG. 10 to be larger than passages 129 formed by float side 121 and portion 125 and passage 130 formed by float side 122 and cover portion 126 as illustrated in FIG. 9. The reason for the larger passage at the location of the illustration in FIG. 10 than the passage at the location of the illustration in FIG. 9 may be understood by considering arbitrary points 131 and 132 on sump weights 6' and 12' which are on a straight line with the location of FIG. 10 as illustrated on FIG. 7; the line being parallel to the side of the reservoir. Points 131 and 132 represent points on the sump weights where the linear weight is relatively greater than points 133 and 134 on sump weights 7' and 13' which lie along a straight line coincident with the point at which FIG. 9—9 is taken on FIG. 7. The greater weights nearer the perimeter cause a greater force on the cover which stretches the cover tighter and makes the gap between the cover and the side of the float larger. The larger passage between the float and the cover nearer the perimeter makes it easier for the larger volumes of gas to flow. This form of enhancement is particularly important where there is a suction pump used in combination with the manifold gas collection pipe. The suction force tends to contract the passage 127 and 128 and it is important that the force of the sump weights exert a greater force in creating the passage. This increase in the size of the passages 127 and 128 adjacent float 113 is illustrated by dashed lines 135 and 136 as illustrated on FIG. 7; dashed lines 137 and 38 along float 112; and dashed lines 139 and 140 adjacent float 111 in FIG. 7.

Referring to the right side of the reservoir cover illustrated in FIG. 7, still another form of gas flow enhancement system is illustrated. In addition to the cover supporting float members 141–143, which are constructed identically to the float members 111–113, surface weight members 144 and 145 are placed approximately midwwy between the float members. The surface weights have a substantially smaller linear weight than the sump weights so that only a relatively small depression is made in the cover at the location of the surface weights. The surface weight members extend along the horizontal cover portions along selected lines extending from proximal locations bordering the perimeter of the reservoir and terminate at distal locations distant from the perimeter of the reservoir. The surface weights are located between and generally parallel to the pairs of cover lifting float members and intersect the perimeter of the reservoir at generally right angles. The surface weight members cooperate with the sump weighting means in urging the gas to migrate toward the open passage ways 146–151 between the sides of the floats and the cover member. The gas migrates along pathways at right angles to the longitudinal axis of the floats and surface weights. Thus gas moves from surface weight 145 along short path 152 to passageway 147 as shown in FIG. 11. In like manner, gas moves from weight 145 along short path 153 to passage 148; along path 154 from surface weight 144 to opening 149, and along short path 155 from surface weight 144 to passage 150.

Referring to FIGS. 12, 13 and 14, a reservoir having a central panel 156 is shown. A central panel cover separated from the perimeter of the reservoir by peripheral sumps 157–160 is preferable in some reservoirs such as those having vertical sidewalls or where the surface area of the reservoir is very large and it is desirable to divide the reservoir into more horizontal cover portions. Thus, the reservoir illustrated in FIG. 12 in addition to having a central horizontal cover portion 156, also includes perimeter horizontal cover portions 161–164. All of the horizontal cover portions are maintained in biaxial tension, that is, the cover is stretched in two horizontal directions which are generally at right angles but at least have sufficiently different horizontal directions to support a workman traversing the cover so that he does not need any special floatation equipment or large foot pad load spreading devices. The bilateral biasing is accomplished generally as previously described by sump weight members 165–172. These sump weights may be made by forming a tube of the material used to make the cover and filling it with sand. The weights are located on the cover and the cover is dimensioned so that as the water level rises, the sump weights will lift off the bottom of the reservoir and maintain the sump walls and the horizontal cover portions of the cover in biaxial tension for all working fill levels of the reservoir. The geometric shape of the reservoir need not be rectangular, in fact several different geometric shapes are shown in my co-pending application, Ser. No. 425,556, and all such shapes may be utilized in this application, such shapes include but are not limited to rectangular, polygonal, hexagonal, rectangular with a triangle at one end, rectangular with a semicircular end, eliptical, and circular. Sump weights 166, 168, 170, and 172 form corner sumps 173–176 which intersect the corners of the reservoir and the peripheral sumps. Thus, all of the rainwater sumps are interconnected so that rain falling on any part of the cover finds its way to drain sump and can be drawn off, drained off, or pumped off from a single location in any one of the drain sumps if necessary. The drain sumps are preprogrammed located in that the sump is always in the same location for any given fill level of the reservoir.

The reservoir cover is connected to the perimeter of the reservoir and a gas collecting means such as a manifold pipe 4 as previously described is positioned so as to collect the gas which migrates from the perimeter horizontal cover portions.

A central gas manifold means is operatively connected to the gas collection means and the central cover panel 156. Referring to FIG. 12, the central gas manifold may consist of a central elongated float 177 which is attached on its top side to the underside of the cover. A central gas manifold pipe 178 is attached to the top side of the central elongated float 177 and runs along the top side of the float to a take-off pipe 179 which connects to the peripheral pipe 4. A suction pump 50 may be used to enhance the flow of gas from the cover.

Since the central portion of the cover is in tension, the cover will be pulled away from the sides 198 and 199 of the float. This creates spaces 200 and 201 permitting the collection of gas. Side cuts can be made in the float as shown by diagonal cuts 202 and 203 to permit the flow of gas from the spaces 200 and 201 to pipe 178. Pipe 178 may be formed with a plurality of openings along its length to permit the inflow of gas.

As shown in FIG. 12, spot weights 181–184 may be placed at the corners of the peripheral sumps 157–160. These spot weights should be spaced from the sump weight ends 185–192.

The form of the reservoir cover in FIG. 12 may be formed with a gas enhancement system in which the central area 156 of the cover is formed with an inner portion 193 surrounded by an outer portion 194. The inner portion 193 is formed from a cover material having a weight per square foot less than the weight per square foot of the cover material forming the outer portion. The differential in cover weight enhances the migration of gas formed beneath the cover inwardly of the central sump to the inner portion of the central cover area.

If the cover is very large or if an even steadier flow is required, one or more mid-cover portions 195 may be formed between the inner and outer cover portions which has a weight per square specification foot midway between the weight per square foot specification of the inner and outer cover portions. The differential in weight may be effected by simply adding plies of material, or by forming the material with different thicknesses or by adding graduated weights such as polyurethane resin or foam.

Preferably the horizontal cover portions formed in the cover between the central sump and the perimeter of the reservoir are formed with an inner peripheral portion 196 bordering the central sump and an outer peripneral portion 197 bordering the perimeter of the reservoir. The inner peripheral portion of the cover bordering the central sump is formed from a cover material having a weight per square foot greater than the weight per square foot of the cover material forming the outer peripheral portion bordering the perimeter of the reservoir. The differential in cover weight enhances the migration of gas formed beneath the cover outwardly of the central sump to the perimeter of the reservoir by exerting less pressure on the cover as the gas approaches the perimeter of the reservoir and the manifold gas pipe 4.

The cover material may be made from various standard plastic or rubber materials such as Hypalon.

The present cover is particularly suitable for gas generation where heat is required to enhance the process. Since the cover rests directly upon the surface of the fluid, solar energy is transmitted directly to the surface. Only a small fraction of the cover is lifted above the surface by gas or floats.

Where the cover is used to collect methane gas from organic materials, it is desirable to layer a polyethylene membrane next to or beneath the Hypalon outer cover. A geo-textile insert may be layered between the Hypalon outer cover and the polyethylene. In this form, the Hyaplon outer cover is more resistant to weathering while the polyethylene membrane is more resistant to the methane gas, or the contained fluids. The important aspect of this feature is the fact that the different plies of different kinds of material need not be bonded to one another. Indeed, the different layers of material may be simply laid on top of one another without any connection therebetween. This layering feature is possible because the sump weights maintain all portions of the cover in tension and thus all layers of the cover are kept in close contact with the reservoir surface.

The present cover is completely sealed from the atmosphere so that where methane gas is being generated beneath the cover, oxygen from the atmosphere cannot mix with the methane to create a potentially explosive mixture of gases.

When the cover is in operation and gases are generated beneath the cover, blisters of gas will form and move toward the periphery of the reservoir or to the manifold in those covers which have a central portion surrounded by a peripheral sump. If a heavy rain should fall on the cover while blisters of gas are moving toward the gas manifolds, the water will tend to flow in the opposite direction of the gas; viz, toward the surface water sumps. Since the entire cover is in biaxial tenson, water will flow toward the sumps around the gas blisters and very little interference will be caused by the blisters in de-watering the cover. Since the cover will be completely de-watered within several minutes after the rain ceases, there is practically no interference by the rainfall in the migration of the gas toward the gas manifold pipes.

The fact that the entire cover is in biaxial tension, prevents the cover from rising above the surface more than a fraction of an inch or so. Further, the gas does not remain stationary beneath any one segment of the cover but moves steadily to the periphery or to a central manifold. This phenomenon, prevents the cover from being lifted above the surface and driven by strong winds. This prevents damage to the cover by tearing and further prevents the wind from moving the cover so as to interfere with the location of the surface water sumps or preventing the progression of gas to the gas manifolds.

In some processes where it is desirable or essential to trap the charged in or generated gas beneath the cover, the central cover portion system illustrated in FIG. 12 is particularly suitable. The peripheral weighted sump traps the gas in the central area and if the gas manifold system is closed, the gases will remain beneath the central cover portion. Curtain members may be hung beneath the peripheral weighted sumps to insure that gas does not migrate beneath the peripheral sump areas to the periphery of the reservoir.

Another method of obtaining variable weighting of the cover in addition to using cover material of different weights or thicknesses is to add a material to the cover such as sand mixed with a suitable binder which is adhered to the cover surface. The sand may be added in multiple layers in selected areas to provide weighting heavier in some areas than in others. Preferably the weighting is evenly graduated from light to heavy so that the gas will move steadily rather than moving swifty from one weight boundary to another.

In this application, I have indicated that different weight materials may be used in the cover as applied to covers with central portions as illustrated in FIG. 12. In fact, the variable cover weight system described may also be used with the cover systems shown in FIG. 1, 4 and 7. For example, in FIG. 1, panel 46 may be formed with cover material of varying weight so that the cover portions adjacent sump weight 5 is heavier than the cover adjacent the periphery 17 of the reservoir. Thus, gas adjacent sump weight member 5 will travel faster to the periphery. This same procedure may also be applied to cover portions in FIGS. 4 and 7. In these covers, graduated weight covers may be used in individual panels such as panel 104 to cause gas to move to the center of the panel. This may be accomplished by providing heavier cover material adjacent the surface weight members 71 and 72.

Referring to FIGS. 7, 8 and 9. A variable cover weight may be used to enhance the migration of gas to the gas spaces 127, 128, 129 and 130. This may be accomplished by providing a heavier weight cover material between the floats 111, 112 and 113.

Referring to FIG. 12, it should be understood that the gas enhancing systems as described in connection with FIGS. 1, 4 and 7 may be used to enhance the movement of gas to the central elongated float 177. This includes variable sump weights; surface weights; floats beneath the cover; and combinations of surface weights and floats beneath the cover.

In the specification and claims, the degree of tension in the cover has been referred to as that amount of tension necessary to permit a workman to traverse all portions of the cover. Applicant in no way warrants that this cover will always support a workman and does not encourage workmen to walk on the cover without prescribed safety equipment.

Referring to FIGS. 15 and 16, an ambient wind gas flow enhancement form is illustrated. It has been observed that when a gas bubble forms beneath the cover, a moderate wind can move the bubole along the underside of the cover. This form of the invention makes it possible to capture such bubbles at the periphery of the reservoir in manifold pipe 4 or at the edges of all the rainwater sumps.

Elongated sump edge floats 204–224 are placed beneath the cover adjacent the sumps 38–42. The entire cover is in biaxial tension as previously described in relation to FIGS. 1, 4 and 7. The cover is affixed to the top of the float only as described in relation to, for example, float 113 in FIG. 10. Thus, a gas space is formed between the underside of the cover adjacent the side of each of the floats 204–224. This gas space is illustrated in FIG. 16 and designated by the numbers 225 and 226. The borders of these gas spaces are illustrated in FIGS. 15 and 16 by the dotted lines 227–246. All of the gas spaces are joined to one another. Where the floats are separated by paths to permit water to drain from the horizontal cover portions to the sumps, a short gas hose designated by the number 247 joins the gas space adjacent floats 204–224. At the corners of the reservoir, the gas spaces are connected to manifold pipe 4 by short gas hoses 248.

The operation of the cover illustrated in FIGS. 15 and 16 is as follows: When a gas bubble forms beneath the cover such as gas bubble 249, the bubble will move in the direction of the surface wind as indicated by arrow 250. In this case, if the wind continued to blow in the direction shown for a sufficiently long time, bubble 249 would move to gas space 225 adjacent float 220. The gas would then travel through the spaces adjacent the floats through gas pipes 247 and 248 until it reached manifold 4 at the perimeter of the reservoir.

Rainwater falling on the horizontal cover portions would flow into the sumps in the rain paths beneath pipes 247 and between the ends of the floats.

In like manner, floats can be placed beneath the cover adjacent the sumps in a reservoir having a central panel as shown in FIG. 12. Gas pipes similar to pipes 247 would connect all gas spaces formed between the ends of floats which were spaced to provide a rainwater path to the drain sumps. The floats adjacent the corners would have gas pipes similar to pipes 248 to connect the gas spaces to the manifold pipe 4. Providing this gas collection system in a central panel reservoir as illustrated in FIG. 12 is especially adapted for processes where air or a process gas is introduced into the reservoir and bubbled up from the bottom of the reservoir. By closing the gas manifold 4, the process gas can be retained in the reservoir until the process is complete. The generated gases and process gas can then be drawn off through the gas spaces adjacent the floats and through a central manifold 179 as shown in FIG. 12.

I claim:

1. A tensioned reservoir cover for placement upon the fluid surface of an open reservoir comprising:
    a. a flexible cover member of substantially fluid impervious material of sufficient area to cover the surface of said reservoir;
    b. means connecting the perimeter of said cover member to the perimeter of said reservoir;
    c. gas collecting means located at the periphery of said reservoir;
    d. sump weighting means positioned with respect to said cover member at pre-selected positions;
    e. a plurality of cover sump portions formed in said cover by said weighting means, each of said sump portions being defined, narrow, elongated and interconnected and having generally vertical sidewalls in tension and having a selected location for all working fill levels of said reservoir;
    f. a plurality of generally horizontal cover portions formed in said cover by said weighting means, each of said horizontal cover portions having a selected geometric shape and positioned at a selected location for all working fill levels of said reservoir and all of said horizontal cover portions are in tension in at least two different horizontal directions of sufficient magnitude to permit workmen to traverse all portions of said horizontal cover portions for all working fill levels with said horizontal cover remaining substantially planar in sustaining the weight of the workmen;
    g. said horizontal cover portions are bordered by said reservoir perimeter and said sump portions and cover substantially all of the surface of said reservoir for all working fluid level conditions; and
    h. said horizontal cover portions bordering said reservoir perimeter are in gaseous communication with said gas collection means.

2. A tensioned reservoir cover as described in claim 1 comprising:
    a. said sump weighting means includes a plurality of elongated sump weight members which extend from proximal locations bordering the perimeter of said reservoir and terminate at distal locations distant from the perimeter of said reservoir; and
    b. each of said sump weight members which extend from proximal locations bordering the perimeter of said reservoir is constructed having a progressively increasing linear weight in direct proportion to the distance from said proximal location at the perimeter of said reservoir.

3. A tensioned reservoir cover as described in claim 1 comprising:
    a. a plurality of surface weight means having a linear weight substantially less than the linear weight of said sump weighting means;
    b. said surface weight means including a plurality of elongated surface weight members depressing portions of said horizontal cover portions along selected lines extending from proximal locations bordering the perimeter of said reservoir and terminating at distal locations distant from the perimeter of said reservoir;
    c. said surface weight members follow generally straight lines intersecting the perimeter of said reservoir at generally right angles; and
    d. path means delineated by said surface weight members for enhancing the migration of gas along said path means to said gas collection means bordering the perimeter of said reservoir.

4. A tensioned reservoir cover as described in claim 3 comprising:
    a. said surface weight member are constructed having a progressively increasing linear weight in direct proportion to the distance from said proximal location at the perimeter of said reservoir.

5. A tensioned reservoir cover as described in claim 1 comprising:
    a. said horizontal cover portions formed in said cover between said perimeter of said reservoir and said sumps distant from said perimeter are sectioned into inner portions and peripheral portions;
    b. said inner portions are formed from a cover material having a weight per square foot greater than the weight per square foot of the cover material forming said peripheral portions; and
    c. said differential in cover weight enhances the migration of gas formed beneath said cover to the perimeter of said cover.

6. A tensioned reservoir cover as described in claim 1 comprising:
    a. weighting means gradually increasing the weight of said horizontal cover portions in direct proportion to the distance from said gas collection means.

7. A tensioned cover as described in claim 6 wherein:
    a. said weighting means consists of a sand and a binding material spread upon said cover in a gradually increasing thickness.

8. A tensioned reservoir cover as described in claim 1 comprising:
    a. a plurality of elongated topside float meabers attached to portions of the upper surface of said horizontal cover portions spaced from one another and extending from proximal locations bordering the perimeter of said reservoir and terminating at distal locations distant from the perimeter of said reservoir;

b. said elongated topside float members follow generally straight lines intersecting the perimeter of said reservoir at generally right angles; and c. path means delineated by said elongated topside float members for enhancing the migration of gas along said paths to said gas collection means bordering said reservoir perimeter.

9. A tensioned reservoir cover as described in claim 1 comprising:

a. a plurality of elongated cover lifting float members having upper surfaces attached to the underside of portions of said horizontal cover portions spaced from one another and extending from proximal locations bordering the perimeter of said reservoir and terminating at distal locations distant from the perimeter of said reservoir;

b. said cover lifting float members having side member portions spaced above said fluid surface and spaced from the underside of said cover;

c. said cover lifting float members follow generally straight lines intersecting the perimeter of said reservoir at generally right angles;

d. said cover lifting float members raise said cover portions attached to said upper surfaces above the fluid surface of said reservoir and said sump weighting means tension said cover holding said cover away from said side member portions of said cover lifting float members providing a constantly open passageway for passage of gas from the underside of said horizontal cover portions to said gas collection means bordering said reservoir perimeter.

10. A tensioned reservoir cover as described in claim 9 comprising:

a. a plurality of surface weight means having a linear weight substantially less than the linear weight of said sump weighting means;

b. said surface weight means including a plurality of elongated surface weight members depressing portions of said horizontal cover portions along selected lines extending from proximal locations bordering the perimeter of said reservoir and terminating at distal locations distant from the perimeter of said reservoir and located between and generally parallel to pairs of said cover lifting float members; and c. said surface weight means cooperating with said sump weighting means, urges gas to migrate toward said open passage ways adjacent said cover lifting float members.

11. A tensioned reservoir cover as described in claim 9 comprising:

a. said sump weighting means includes a plurality of elongated sump weight members which extend from proximal locations bordering the perimeter of said reservoir and terminate at distal locations distant from the perimeter of said reservoir;

b. each of said sump weight members which extend from proximal locations bordering the perimeter of said reservoir is constructed having a progressively decreasing linear weight in direct proportion to the distance from said proximal location at the perimeter of said reservoir; and c. said sump weight members having said decreasing linear weight construction cause said cross sectional area of said constantly open passageway adjacent said cover lifting float members to be progressively smaller in direct proportion to the distance from the perimeter of said reservoir.

12. A tensioned reservoir cover as described in claim 1 comprising:

a. said weight means is positioned on said cover to form a central sump and a central horizontal cover portion;

b. said weighting means is positioned on said cover forming a plurality of lines of segmented weights connecting each corner of said reservoir to said central sump; and c. central gas manifold means operatively connecting said gas collection means and said central horizontal cover portion.

13. A tensioned reservoir cover as described in claim 12 comprising:

a. said central area of said cover is formed with an inner portion surrounded by an outer portion;

b. said inner portion of said cover is formed from a cover material having a weight per square foot less than the weight per square foot of the cover material forming said outer portion; and c. said differential in cover weight enhances the migration of gas formed beneath said cover inwardly of said central sump to said inner portion of said central cover area.

14. A tensioned reservoir cover as described in claim 13 comprising:

a. said horizontal cover portions formed in said cover between said central sump and said perimeter of said reservoir are formed with an inner peripheral portion bordering said central sump and an outer peripheral portion bordering said perimeter of said reservoir;

b. said inner peripheral portion of said cover bordering said central sump is formed from a cover material having a weight per square foot greater than the weight per square foot of the cover material forming said outer peripheral portion bordering said perimeter of said reservoir; and c. said differential in cover weight enhances the migration of gas formed beneath said cover outwardly of said central sump to said perimeter of said reservoir.

15. A tensioned reservoir cover as described in claim 12 comprising:

a. a plurality of surface weight means having a linear weight substantially less than the linear weight of said sump weighting means; and b. said surface weight means including a plurality of elongated surface weight members depressing portions of said central horizontal cover portion along selected lines extending from proximal locations bordering the perimeter of said central sump and distal locations bordering said central gas manifold means.

16. A tensioned reservoir cover as described in claim 12 comprising:

a. a plurality of elongated topside float members attached to portions of the upper surface of said horizontal cover portions spaced from one another and extending from proximal locations bordering the perimeter of said reservoir and terminating at distal locations bordering said central sump;

b. said elongated topside float members follow generally straight lines intersecting the perimeter of said reservoir at generally right angles;

c. path means delineated by said elongated topside float members for enhancing the migration of gas along said paths to said gas collection means bordering said reservoir perimeter;

d. said central gas manifold means includes an elongated central float member attached to the underside of said cover;

e. a plurality of elongated central topside float members attached to portions of the upper surface of said central horizontal cover portion spaced from one another and extending proximal locations bordering said central sump and terminating at distal locations adjacent said central float member;

f. said elongated central topside float members follow generally straight lines intersecting portions of said central sump and said elongated central float member at generally right angles; and g. path means delineated by said central topside float members for enhancing the mirgration of gas along said paths to said central gas manifold;

17. A tensioned reservoir cover as described in claim 12 comprising:

a. said central gas manifold means includes an elongated central float member attached to the underside of said cover;

b. a plurality of elongated cover lifting float members having upper surfaces attached to the underside of portions of said central horizontal cover portion spaced from one another and extending from proximal locations bordering said central sump and terminating at distal locations adjacent said central float member;

c. said cover lifting float members having side member portions spaced above said fluid surface and spaced from the underside of said cover;

d. said cover lifting float members follow generally straight lines intersecting portions of said central sump at generally right angles;

e. said cover lifting float members raise said cover portions attached to said upper surfaces above the fluid surface of said reservoir and said sump weighting means tension said cover holding said cover away from said side member portions of said cover lifting float members providing a constantly open passageway for passage of gas from the underside of said horizontal cover portions to said central gas collection means.

18. A tensioned reservoir cover as described in claim 1 comprising:

a. said cover member consists of a first ply formed from a material resistant to the liquid and solid materials filling said reservoir; and b. said cover member consists of a second ply formed from a material resistant to the effects of climate layered on top of said first ply.

19. A tensioned reservoir cover as described in claim 1 comprising:

a. a plurality of cover lifting sump edge float members having upper surfaces attached to the underside of portions of said horizontal cover portions located closely adjacent a side of said cover sump portions;

b. said cover lifting sump edge float members having side member portions spaced above said fluid surface and spaced from the underside of said cover;

c. said cover lifting sump edge float members raise said cover portions attached to said upper surface above the fluid surface of said reservoir and said sump weighting means tension said cover away from said side member portions of said cover lifting sump edge float members providing a constantly open passageway for passage of gas from the underside of said horizontal cover portions to said gas collection means;

d. water means permitting flow of surface water from said horizontal cover portions to said cover sump portions; and e. gas passage means connecting said open passageways adjacent said cover lifting sump edge float members and said gas collecting means.

* * * * *

UNITED STATES PATENT AND TRADEMARK OFFICE
CERTIFICATE OF CORRECTION

PATENT NO. : 4,503,988

DATED : March 12, 1985

INVENTOR(S) : Dennis H. Gerber

It is certified that error appears in the above-identified patent and that said Letters Patent is hereby corrected as shown below:

In Column 2, line 20, "collectidn" should read --- collection ---

In Column 2, line 68, "to" should read --- of --- and "systems" should read --- system ---

In Column 7, line 1, "elongate" should read --- elongated ---

In Column 7, line 18, "agy" should read --- any ---

In Column 9, line 1, "midwwy" should read --- midway ---

In Column 9, line 64, after "way to" should read --- a ---

In Column 10, line 42, "specification foot" should read --- foot specification ---

In Column 10, line 53, "peripneral" should read --- peripheral ---

UNITED STATES PATENT AND TRADEMARK OFFICE
CERTIFICATE OF CORRECTION

PATENT NO. : 4,503,988

DATED : March 12, 1985

INVENTOR(S) : Dennis H. Gerber

It is certified that error appears in the above-identified patent and that said Letters Patent is hereby corrected as shown below:

In Column 12, line 46, "bubole" should read --- bubble ---

In Column 14, line 36, "member" should read --- members ---

In Column 14, line 64, "meabers" should read --- members ---

In Column 17, line 11, after "extending" should read --- from ---

In Column 17, line 19, "mirgration" should read --- migration ---

Signed and Sealed this

Twenty-third Day of July 1985

[SEAL]

Attest:

DONALD J. QUIGG

Attesting Officer

Acting Commissioner of Patents and Trademarks